United States Patent [19]

Horn et al.

[11] Patent Number: 5,176,983
[45] Date of Patent: Jan. 5, 1993

[54] POLYMERIC NITRONES HAVING AN ACRYLIC BACKBONE CHAIN

[75] Inventors: Keith A. Horn, Long Valley, N.J.; Christine L. Lau, Meriden, Conn.

[73] Assignee: Allied-Signal Inc., Morristownship, Morris County, N.J.

[21] Appl. No.: 664,248

[22] Filed: Mar. 4, 1991

[51] Int. Cl.[5] .................. G03C 1/73; C08F 12/00
[52] U.S. Cl. ................................ 430/270; 525/327.2; 526/245; 526/292.2; 526/298; 526/311
[58] Field of Search ................ 430/270; 525/327.2; 526/245, 292.2, 298, 311

[56] References Cited

U.S. PATENT DOCUMENTS 3,988,229  10/1976  Pacifici et al. .................. 204/159.23
4,677,049   6/1987  Griffing et al. ...................... 430/339
4,702,996  10/1987  Griffing et al. ...................... 430/325

OTHER PUBLICATIONS

R. Schiever et al., "Optical Waveguiding in Doped Poly(methyl Methacrylate)", Polymer, Aug. 26, 1985, (Conference Issue) pp. 1423-1427.
Takato et al., "Polyer Waveguide Star Coupler", Applied Optics, 21, No. 11 Jun. (1982) pp. 1940-1941.
Kurokawa et al., "Polymer Optical Circuits for Multimode Optical Fiber Systems", Applied Optics, 19, No. 18, Sep. 15, 1980, pp. 3124-3129.
Kurokawa et al., "Polymer Optical Circuits for Multimode Optical Fiber Systems", Org. Coat. Plast. Chem., 1979, 40, pp. 368-373.
Kurokawa et al., "Fiber Optic Sheet Formation by Selective Photopolymerization", Allied Optics, 17, No. 4, Feb. 15, 1978, pp. 646-650.
Kurokawa et al., "Optical Waveguide Intersections Without Light Leak", Applied Optics, 16, No. 4, Apr. (1977), pp. 1033-1037.
Katayama et al., "Formation Method of Optical Waveguides in a Polymer Film . . . " Org. Coat. Plast. Chem., 1979, 40, pp. 374-379.
H. Franke, "Refractive-Index Patterns in Doped PMMA Films, Recorded With a HeNe Laser", Polymer, 28, (1987) pp. 659-662
H. Franke, "Optical Recording of Refractive-Index Patterns in doped poly-(methyl Methacrylate) Films", Applied Optics, 23, No. 16, Aug. 15, 1984, pp. 2729-2733.
Franke et al., "Light Induced Refractive Index Changes in PMMA Films Doped With Styrene", Coll. & Pol. Science, 262, No. 3, (1984), pp. 213-216.
Driemeier et al., "High-Resolution Photorefractive Polymer for Optical Recording of Waveguide Gratings", 25, No. 17, Sep. 1, 1986, Appl. Optics, pp. 2960-2966.
L. A. Hornak, "Polyalkylsilyne Photodefined Thin-Film Optical Waveguides", J. Applied Phys., 67, No. 5, Mar. 1, 1990, pp. 2235-2239.
"Photoinduced Channel Waveguide Formation in Nonlinear Optical Polymers" Electronics Letters, 26, No. 6, Mar. 15, 1990, pp. 379-380.
Luckemeyer et al., "Photinduced Phase Modulation in PMMAS Lightguides Doped with an Azo Dye", SPIE Taguny, La. 90.
Chemical Abstracts, vol. 85, p. 39, 85:22348b.
Chemical Abstracts, vol. 109, p. 762, 109:160628h.
Chemical Abstracts, vol. 109, p. 599, 109:101917d.
Chemical Abstracts, vol. 107, p. 759, 107:187266j.
O. H. Wheeler et al., "Absorption Spectra of Azo-and Related Compounds, II[1] Substituted Phenylnitrones", JACS, 78, (1956), pp. 3363-3366.
"Preparation of Oxaziranes by Irradiation of Nitrones", Communications, vol. 23, Apr. 1958, pp. 651-652.
Splitter et al., "Oxaziridines. I. The Irradiation Products of Several Nitrones" Oxaziridines, Oct. 1865, pp. 3427-3436.
"Orbital Symmetry Control in the Nitrone-Oxaziridine System. Nitrone Photostationary States", J. Am. Chem. Soc., (93:16), Aug. 11, 1971, pp. 4075-4076.
Smets et al., "Influence of Rigid Polymer Matrices on the Reversible Photochemical Reaction . . . ", J. Pol. Science, vol. 14, (1976), pp. 2983-2994.
Jean-Luc Decout et al., "A New Process of Photoreticulation of Polymers", *Photographic Science and Engineering* (USA), vol. 23, No. 5, Sep.-Oct. 1979, pp. 309-311.
*Chemical Abstracts,* vol. 115, 1991, Columbus, Ohio U.S.A., Beeson et al.: "Polymeric Materials for Guided-Wave Devices", Abstract No. 30262x from Proc. SPIE-Int. Soc. Opt. Eng. 1990, 1337 (Nonlinear Opt. Prop. Org. Mater. 3), 195-202.

*Primary Examiner*—Cynthia Hamilton
*Attorney, Agent, or Firm*—Gerhard H. Fuchs; Richard C. Stewart

[57] ABSTRACT

Homopolymers and copolymers with an acrylic backbone chain having pendant side-chains containing a nitrone functional group undergo change in refractive index upon exposure to actinic radiation. Waveguides are "written"in films containing such polymers by exposing predtermined areas to sufficient actinic radiation to change the refractive index.

18 Claims, No Drawings

POLYMERIC NITRONES HAVING AN ACRYLIC BACKBONE CHAIN

FIELD OF THE INVENTION

This invention provides polymers—homopolymers as well as copolymers—having an acrylic backbone chain containing side-chain nitrone functional groups. These polymers undergo a change in refractive index upon exposure to actinic radiation. The decrease in refractive index of thin films of these polymers upon such exposure can be utilized for making optical waveguides or other optical device structures.

BACKGROUND OF THE INVENTION

With the development of single-chip integrated optical structures containing laser sources, passive and active waveguides and detectors, new materials are needed for making wave guides, "chip-to-chip" and "backplane interconnects" that can be patterned using processing technologies suitable for silicon and gallium arsenide electronic devices. Organic polymer films offer potential advantages over waveguides based on inorganic crystals, because the former can be processed at much lower temperatures; they are amenable to solution spin casting and other coating techniques; they have lower dielectric constants; and they can have large electro-optic or other nonlinear optical responses that are electronic in origin and therefore have low losses even in high frequency regimes.

Free-standing rib waveguides have been formed in organic films by generating refractive index patterns by methods such as (1) photochemical crosslinking, followed by dissolution of the remaining uncrosslinked material; (2) "photo-locking," i.e. photochemical attachment, dimerization or polymerization of a high refractive index monomer in a transparent polymer matrix film, followed by baking to remove the remaining volatile monomer from unirradiated areas; (3) patterned argon ion laser irradiation; and (4) thermal annealing. Further, photochemical bleaching of dye molecules in polymer matrices without crosslinking, dimerization or polymerization has been explored as a mechanism for changing the refractive index in organic thin films.

Formation of waveguide structures in nonlinear optical organic materials (including polymers) through the photochemical transformation of photoreactive functional groups (photodelineation) is disclosed in commonly assigned copending U.S. Ser. No. 456,411 filed Dec. 26, 1989 by McFarland et al. for "Method for Forming Optically Active Waveguides." Also, Mohlman et al. [G. R. Mohlmann et al., SPIE 1177 O-9, Boston, September 1989] have described the use of radiation from a mercury lamp to bleach films of a methacrylate polymer with a side chain 4-dimethylamino-4-nitrostilbene photoreactive functional group to produce optical waveguide structures. Horn et al. have described similar laser and contact mask exposure patterning of channel waveguide structures in thin films of PMMA containing monomeric nitrones [K. A. Horn et al., "Polymeric Materials for Guided Wave Devices," The 1989 International Chemical Congress of Pacific Basin Societies, Honolulu, Hawaii, Dec. 17–22, 1989, Macr. 82.]. Their monomeric nitrones were made by standard synthetic routes from the corresponding aldehydes and substituted hydroxylamines. Doses of only several mJ to hundreds of mJ per square centimeter were required to fully bleach thin films of nitrones in poly(methylmethacrylate).

Previously disclosed waveguides utilizing nitrones are based on monomeric nitrones only. We are not aware of any disclosure of polymers with nitrone functional groups. There are several reasons for this. First, the nitrones are excellent radical scavengers, as illustrated by the fact that monomeric nitrones are used as stabilizers for polymers especially during processing at elevated temperatures (e.g. melt processing). Thus, free radical polymerization of monomers containing nitrone functional groups is fully inhibited by the functional group itself. Second, attempted syntheses of nitrone polymers containing olefinic functional groups result in dipolar cycloaddition. Apparently, there is no standard route to polymeric nitrones.

While photodelineation on organic films to form waveguides provides significant improvements over the prior art because it eliminates involved processing steps and avoids both thermal and etch damage to sensitive silicon and gallium arsenide electronic components, the existing materials have several shortcomings. In the known dye/polymer (guest/host) materials only low concentrations (<30%) of the monomeric dye can be dissolved in the transparent host polymer matrices such as PMMA, polystyrene polyvinyl alcohol and polycarbonate. For example, concentrations of above about 9–13 percent of the azo dye disperse red #1 in PMMA result in phase separation and crystallization, producing a highly scattering film. Also, the photochemically reactive dye species is readily leached out of the host matrix by solvents used in subsequent processing steps, or it is baked out in the course of removal of residual spinning solvent, resulting in refractive index changes in the waveguide films. Further, the glass transition temperature of the guest/host film generally decreases with increasing dye molecule concentration, thus compromising the physical integrity of the film. In addition, all of the chromophores previously used in these systems, except for the nitrones, have low quantum yield photoreactions, and thus require high actinic radiation doses. While the prior art polymeric systems avoid the problems of the guest/host systems—i.e. low concentration limit, bake-out and $T_g$ deterioration—the photochemical reaction quantum yields for their chromophores still tend to be low. The exposure doses required for refractive index changes (to 50% of saturation) generally are on the order of joules to hundreds of joules per square centimeter, with resultant exposure times of hours with standard lamps and laser sources. These high irradiation doses tend to degrade the polymer backbone, and result in cross linking or other adverse side reactions, with undesirable refractive index changes and deterioration of physical properties. Further, at these high irradiation levels, secondary photoproducts are generated which, even in trace amounts, can cause unacceptably large waveguide losses if they absorb in the visible or infrared regions.

There is a need for new polymeric materials whose refractive index can be changed by actinic radiation with low doses while avoiding or alleviating the above stated shortcomings of the prior art materials.

SUMMARY OF THE INVENTION

The present invention provides polymers based on acrylate and methacrylate backbones which are substituted with side chains bearing functionalized nitrones.

The polymers are prepared by novel synthetic routes which avoid the difficulties of the prior art. They are soluble in solvents of the type commonly employed for spin coating (in specific cases even at 100 mol % loading of the photoreactive nitrone chromophore). They form amorphous films transparent to many visible and near IR laser sources, and they can be photochemically bleached with UV or visible radiation with high photospeed. The radiation doses required are sufficiently low so that photochemical side reactions of the polymer backbone are minimized. The waveguide losses in these polymer films are surprisingly lower than in guest/host compositions of comparable nitrone loading. The films are thermally stable, showing less than 1 percent weight loss by TGA analysis to temperatures as high as 225° C. Since the photoreactive chromophores are attached to the polymer backbone, there is no loss of the chromophore during processing steps which require heating to temperatures below the onset of thermal decomposition. Waveguide structures with low transmission losses can be photochemically delineated in thin films of these polymers.

The novel polymeric nitrones of the present invention have the general formula:

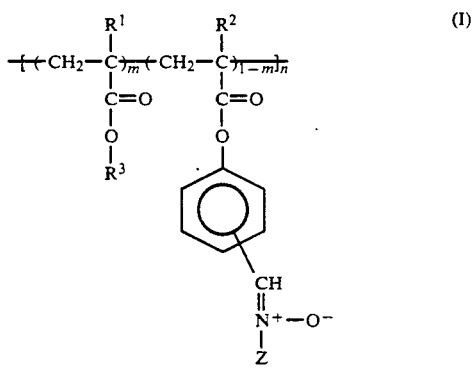

wherein
(a) n is an integer greater than 10;
(b) m is 0–0.99;
(c) $R^1$ and $R^2$, which may be the same or different, are H or $C_1$-$C_{20}$ alkyl, straight chain, branched or cyclic, with the proviso that when $R^1$ and/or $R^2$ represent an alkyl group other than methyl, then its alpha-carbon always represents a —$CH_2$— group;
(d) $R^3$ is a saturated $C_1$-$C_{20}$ aliphatic, aromatic or mixed aliphatic/aromatic hydrocarbon group;
(e) Z is
(i) a $C_1$-$C_{20}$ alkyl group, straight chain, branched or cyclic; or
(ii)

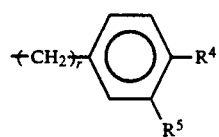

wherein R is 0 or 1, and wherein $R^4$ and $R^5$, which may be the same or different, are selected from the group consisting of H, F, Cl, Br, I, —CN, —$NO_2$, —$NH_2$, —$R^6$, —$NR^6_2$, —$OR^6$, and —CH=CH—$COOR^6$ wherein $R^6$, which may be the same or different in different $R^6$ groups, is a $C_1$-$C_{20}$ alkyl group, straight chain, branched or cyclic.

The present invention further provides methods for making the above-described polymeric compositions, thin films of these compositions, waveguides comprising these compositions, and methods for defining waveguides in films of these compositions.

DETAILED DESCRIPTION OF THE INVENTION

In the polymeric nitrone compositions of formula (I), above, when the $R^1$ and $R^2$ substituents include those containing more than 2 carbon atoms, they may be represented by the formula —$CH_2$—$C_sH_{2s+1}$ if they are straight chain or branched alkyl groups, or by the formula —$CH_2$—$C_sH_{2s}$ if they are cyclic, wherein s represents an integer of from 1 to about 20, preferably from 1 to about 10, more preferably from 1 to about 4. Specific examples of $R^1$ and $R^2$ substituents contemplated as suitable for purposes of the present invention include methyl and ethyl groups, as well as the n- and iso- configurations of propyl, butyl, pentyl, hexyl, heptyl, octyl, nonyl, decyl etc. groups.

When the $R^3$, Z and $R^6$ substituents are a $C_1$-$C_{20}$ alkyl group, they may be represented by the formula $C_tH_{2t+1}$ if they are straight chain or branched alkyl groups, or by the formula —$C_tH_{2t}$ if they are cyclic, wherein t represents an integer of from 1 to about 20, preferably from 1 to about 10, more preferably from 1 to about 4. Specific examples of $R^3$, Z and $R^6$ substituents contemplated as suitable for purposes of the present invention include methyl and ethyl groups, as well as the n- and iso- configurations of propyl, butyl, pentyl, hexyl, heptyl, octyl, nonyl, decyl etc. groups.

When $R^3$ is an aromatic group, then it is desirably phenyl. If it is mixed aromatic/aliphatic, then it may be an arylalkyl group, as for example a benzyl group; an alkylaryl group, such as an alkyl-substituted phenyl group; or an alkylarylalkyl group, such as alkyl-substituted benzyl.

Copolymeric compositions of formula (I), above, may be of random or stereoregular configuration. The nitrone functional groups can be of either cis- or transconfiguration, or a mixture of cis- and trans-, and the description herein as well as the appended claims are intended to cover all of these configurations. For use in the intended purpose, i.e. optical waveguides, both configurations are acceptable, however the transconfiguration is synthetically the most accesssible and is generally preferable as the thermodynamically most stable isomer. These polymers are transparent in the visible and near infra-red (400–2,000 nm) regions. They can be photochemically bleached by UV or visible radiation, with concomitant refractive index changes.

The polymers of formula (I), above (the copolymers wherein m is greater than 0 as well as the homopolymers wherein m is 0) generally will have a molecular weight in the order of between 2000 and 500,000, and a typical weight average molecular weight of from about 15,000 to about 100,000. Their glass transition temperature will ordinarily be in the range from about 50° to about 250° C.

The copolymers and homopolymers of formula I, above, in which $R^1$=$R^2$=$R^3$=$CH_3$ and Z=phenyl are all amorphous polymers which are transparent to UV and visible light of wavelength from about 350 nm to about 2,000 nm, except in narrow regions where near infra-red overtone or absorption bands occur. These polymers readily form transparent thin films when cast or spin cast from solvents such as dimethyl formamide, dimethyl sulfoxide, dimethyl acetamide and the like. The refractive index of these polymers can be varied from that of the homopolymer comprised of the monomer not bearing the nitrone functional group (in the specific case $R^1=R^3=CH_3$, polymethylmethacrylate, refractive index=1.489) to that of the homopolymer of the monomer bearing the nitrone functional group ($R^2=CH_3$, Z=phenyl, refractive index 1.6707). The refractive index is a linear function of the number density of the nitrone bearing monomer in the copolymer, and is therefore approximately linear in weight percent nitrone monomer. The refractive index can therefore be readily controlled relative to that of the various substrates and buffer layers useful in integrated optics applications over the range between the refractive indexes of the two comonomer homopolymer compositions. The ability to modify the refactive index allows one to satisfy the basic waveguiding requirement that the refractive index of the guiding layer be higher than that of the cladding medium.

A second advantage of the copolymers is that the difference in refractive index obtained upon full chemical bleaching can be controlled. For example, irradiation of the homopolymer in the case where $R^2=CH_3$ and Z=phenyl (m=0) results in a decrease of the refractive index of 2.1 percent. In contrast, the decrease in refractive index observed for 30 weight percent copolymer with methylmethacrylate ($R^1=R^2=R^3=CH_3$ and Z=phenyl, m=0.18) is only 0.5 percent. Since the weight percent of the nitrone monomer can be smoothly varied from less than 1 percent to 100 percent, the refractive index change can be controlled for the variation in guided-wave patterns desired. In those cases in which guided wave structures with small radius bends and many splitters are patterned, one requires, in general, a larger change in refractive index (such as that observed for the homopolymer discussed above) in order to prevent losses and to realize full confinement of the light. However, in cases where one desires to efficiently couple a single mode waveguide for 0.8-1.5 micron light to a larger diameter single-mode optical fiber, the smaller refractive index differences obtained upon irradiation of the copolymers allow larger dimension single-mode waveguides and more efficient coupling. The ranges of substituents $R^{1-3}$, Z and $R^{4-5}$ allow one to tailor the range of refractive indexes for the unirradiated copolymer series.

The homopolymers of formula (I), above, wherein m is O are prepared by the free radical polymerization of protected acrylic aldehydes of the structure

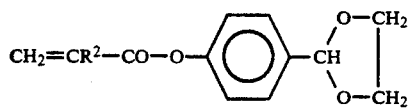

followed by deprotection of the aldehyde functionality and reaction with a substituted hydroxyl amine. These protected aldehydes are prepared by standard reactions known to those skilled in the art. For example, m- or p-hydroxybenzaldehyde is dissolved in diethyl ether, methylene chloride or other low boiling anhydrous solvent and the solution is purged with inert gas, such as nitrogen or argon. To this solution is added an equimolar quantity of the appropriate acryloyl chloride bearing the desired $R^2$ substituent, followed by addition of the base. A reaction exotherm follows, with the formation of the hydrochloride salt of the specific base used. When ester formation is complete as indicated by the absence of starting hydroxybenzaldehyde (as may be monitored by silica gel TLC, for example), the reaction mixture is washed with dilute base (e.g. aqueous bicarbonate solution) and water, followed by drying over magnesium sulfate. The reaction solvent is removed in vacuo to recover the product acrylic ester.

The ester thus obtained bears a free aldehyde functional group which must be protected by means of a readily removable protecting group to prevent crosslinking in the following free radical polymerization step. Acetals are a preferred class of protecting groups, since they are compatible with the succeeding reactions. They are provided by conventional acid-catalyzed acetalization reactions. To this end, the ester bearing the free aldehyde group is dissolved in an inert solvent which is immiscible with water, preferably one having a boiling point in the range of about 100° C. to about 180° C. Exemplary solvents include substituted benzenes, such as toluene. To this solution is added a molar excess (typically a two-fold or greater excess) of an anhydrous alcohol, such as methanol, propanol or butanol or, preferably, a diol such as ethylene glycol. A catalytic amount of a strong organic acid such as p-toluenesulfonic acid is added, and the reaction mixture is heated at reflux in an apparatus equipped with a reflux condensor and a Dean-Stark trap to remove the water formed during acetal formation. Heating is continued until the theoretical one equivalent of water has been removed. The resultant solution is washed with dilute aqueous base, preferably 5 percent aqueous sodium carbonate, the solvent is distilled off, and the remaining protected aldehyde is dried over a suitable drying agent, such as magnesium sulfate. If desired, the product may be chromatographed on a basic alumina column prior to further use.

The free radical polymerization of the acetal is carried out in a suitable inert solvent, such as dimethyl formamide or toluene, generally at temperatures in the range of from about 25° C. to about 70° C., preferably in the 30° C.-40° C. range to insure formation of high molecular weight product. Typically, about 10 ml of solvent is used for each gram of the reactive monomer. Polymerization is conducted in the presence of a free radical generating initiator, such as 2,2'-azobis(2-methylpropanenitrile) (hereinafter referred to as "AIBN"). Other suitable initiators include 2,2'-azobis(2,4-dimethyl-4-methoxypentanenitrile) and 2,2'-azobis(2-methylbutanenitrile). The 2,2'-azobis(2-methyl-4-methoxypropanenitrile) is preferred. Such initiators are available from DuPont under its VAZO trademark. VAZO-33 ® is a preferred initiator when $R^2=CH_3$ and the protecting group is 2,5-dioxolanyl, which is a preferred protecting group. In a typical procedure, a solution of the acrylic acetal and initiator (e.g. VAZO-33 ® initiator) in an amount from 0.001 to about 0.5 mol percent (preferably about 0.01 to about 0.1 mol percent) is degassed by three freeze-pump-thaw cycles and then sealed under vacuum. The sealed vessel is then immersed in a thermostated waterbath which is maintained at the chosen polymerization temperature. The solution is stirred and heated for the desired polymerization time, typically for a time equal to, or greater than, 5 half-lives of the initiator. The resultant polymer can then be recovered by conventional procedures, such as by precipitation into aqueous alcohol, generally methanol, followed by filtration, washing and drying. The acetal homopolymer is then deprotected by treatment with dilute aqueous acid (typically 5 percent aqueous hydrochloric acid) at room temperature in a good solvent for the polymer (typically tetrahydrofuran). The desired deprotected aldehyde polymer is recovered by precipitation in dilute aqueous base, followed by filtration, washing and drying.

The nitrone homopolymer is made by the reaction of an alkyl or aryl substituted hydroxyl amine with the free aldehyde polymer at room temperature, preferably in a chlorinated hydrocarbon solvent such as methylene chloride. An alkyl substituted hydroxyl amine, for example tertiary butyl hydroxyl amine, is preferred since the corresponding nitrones are more hydrolytically stable and form fewer long wavelength absorbing photoproducts on irradiation. An excess of the aromatic or alkyl substituted hydroxylamine reagent is used. Typically, the excess is in the order of from about 10 to about 100 percent. A drying agent such as anhydrous sodium sulfate or magnesium sulfate can be used to remove the water which is formed in the condensation reaction, thus driving the equilibrium toward the nitrone product. In most cases, the reaction vessel must be shielded from room light as the nitrone functionalized polymers are sensitive to light in the 300 to 400 nm wavelength region. The reaction generally is complete within several hours to several days. Typically, the reaction is stirred at room temperature for 2 to 3 days. The polymer is then precipitated in methanol, filtered, washed with methanol to remove any excess of the substituted hydroxylamine reagent, and dried in vacuo at slightly elevated temparature, if desired, say at about 40° C. The nitrone homopolymers corresponding to formula (I) should be protected from ambient actinic radiation, particularly in the 300 to 400 nm region, during the processing and purification steps. The homopolymer purity can be assessed by IH NMR, 13C NMR and IR analyses. In particular, the IH NMR analysis can show the absence of the aldehydic proton absorption of the starting material which is generally observed in the 9.0–10.0 ppm region, and of the proton of the nitrone functional group generally found in the 6.5 to 8.0 ppm region. Intrinsic viscosity measurements in dimethyl formamide, nitrobenzene or chloroform provide qualitative estimates of the molecular weight of the material formed. Typical intrinsic viscosities of polymers useful for spin coating of substrates such as silicon wafers are in the range of from about 0.1 to about 0.3. Gel permeation chromatography can be used for molecular weight determination only if polar solvent combinations, such as dimethylformamide with 0.1 molar sodium nitrate, are used. In lower polarity solvents the homopolymers tend to elute with the solvent front and no estimate of molecular weight can be obtained. Differential scanning calorimetry provides estimates of the glass transition temperatures except in those cases where the glass transition temperature is near the decomposition temperature for the polymer, or where the transition is very weak. In these cases, thermal mechanical analysis can be used.

The route to the copolymers of formula (I), above, wherein m is greater than 0 is as follows:

An acrylic monomer with the desired $R^1$ and $R^3$ substituents is copolymerized with a comonomer which is a protected acrylic aldehyde bearing the desired $R^2$. The protected acrylic aldehydes are prepared as above described for the nitrone homopolymer formation. They are typically acetals of acrylates prepared from m- or p-hydroxybenzaldehyde. The two comonomers are dissolved in the polymerization solvent (e.g. dimethylformamide or toluene) in the molar ratio (from about 1 to about 99 mol percent acrylic monomer with the desired $R^1$ and $R^3$ substituents) desired in the copolymer. As in the case of the homopolymers, the polymerization is run at a temperature in the range of from about 30° C. to about 70° C., preferably in the range of from about 30° C. to about 40° C. to assure the formation of high molecular weight product. The free radical initiator can be chosen from among those described above. They include initiators such as AIBN or DuPont's VAZO ® series. The polymerication is thermostatted and run in freezed-pump-thaw degassed solvents as described for the homopolymers. The polymer is isolated by precipitation in methanol, and the comonomer ratio can be determined by IH NMR integration of the acetal hydrogens and comparison with the aliphatic hydrogens of the polymer backbone. In all cases investigated, the incorporation of the comonomer determined by IH NMR was identical to the feed ratio of the two monomers. Hydrolysis of the acetal protecting group and reaction of the deprotected aldehyde with either an aryl or, preferably, an alkyl hydroxylamine (e.g. tert-butyl hydroxylamine) are carried out as described for the homopolymers.

The polymeric compositions of the present invention can be used to create thin films with refractive index patterns for optical waveguides on a wide variety of substrates including glass, plastics, polyimide circuit board laminates, metal conductors, silicon and oxided silicon wafers, gallium arsenide wafers and other substrates used for electonic and optoelectronic devices and circuitry. Of course, some substrates would require an interposed buffer layer, as is conventional and known to those skilled in the art. The nitrone polymers of this invention can be cast as thin films on these substrates from solution. Typically, the polymer is dissolved in a suitable solvent such as dimethylformamide, dimethylacetamide or dimethylsulfoxide to form a solution containing from about 10 to about 50 percent by weight, preferably from about 20 to about 30 percent by weight of solids when the polymer molecular weight is in the order of from about 10,000 to about 100,000. These solutions can be applied by dip coating, doctor blading or spin casting to obtain films whose thickness will generally be from about 0.1 to about 100 microns. For films of thickness greater than approximately 10 microns, dip coating or doctor blading will generally be preferred. The spin casting method is capable of producing films with low surface roughness and uniform thickness in the order of 0.1 to 10 microns. After the polymer is coated on the desired substrate, the film is baked at a temperature and for time sufficient to remove the solvent, preferably at a temperature within ±10 degrees of the glass transition temperature of the polymer. When spin casting from dimethylformamide, dimethylacetamide or dimethysulfoxide at ambient humidity above about 35 percent, the spin casting is desirably carried out under dry nitrogen to prevent condensation and premature precipitation of the polymer from the solution.

Optical waveguides employing the homopolymers and copolymers of formula (I), above, can be prepared by spin coating, dip coating or doctor blading a solution of such polymer on a substrate such as silicon or gallium arsenide, and then imposing a refractive index pattern by means such as photochemical delineation. The coated transparent films can be patterned by selectively exposing areas of the film to effective radiation using a lithographic contact or projection mask having a negative pattern. The term "negative pattern" as employed herein refers to a pattern in which the regions where a decrease in the refractive index is sought transmit the radiation to induce photochemical rearrangement of the nitrone. Generally, these regions would define the boundaries of waveguiding regions. Both the irradiated and unirradiated films are transparent to radiation having wavelengths longer than that of the effective radiation causing the photochemical bleaching. The term "transparent" as employed herein refers to an optical medium which transmits useful intensities of the light being guided in the film. An alternative way to photochemically induce refractive index patterns in these materials for waveguides and integrated optics would be to scan a UV or visible laser source, which has been focussed tightly using appropriate lens systems, in the desired pattern.

The delineation of refractive index patterns in these films to form optical waveguides and integrated optical devices is accomplished by irradiation of the films. One suitable method involves the use of a photolithographic mask and noncoherent light from a Xenon arc lamp or other projection lamp system as commonly employed in the art of microlithography. The mask is made as the negative of the waveguide pattern, since in the illuminated areas the refractive index will be decreased. The pattern can also be formed by laser illumination, for example by an an argon ion laser (351 nm or other UV line) focussed onto the film with a 10X microscope objective. A set of computer controlled stepper motor driven XY translation stages can be used to translate the sample under the laser beam in the pattern of the desired refractive index changes. The laser beam power would typically be 1.4 microwatt, the spot diameter approximately 5 microns and the scan rate approximately 250 microns/s. The irradiated areas become the lateral boundaries of the waveguides. With either method, waveguides with width of 1 micron or narrower, and up to any desired width can be formed, permitting formation of both single mode and multimode waveguides. Since the refractive indexes of the unirradiated polymers are controlled by the weight percent of the nitrone comonomer, the starting refractive index can be tailored to the specific application. Since homopolymer compositions have higher refractive indexes than the copolymer compositions, the homopolymers would typically be used when the guided-wave patterns contain more tight radius curves. In these cases, the higher refractive index variations between the irradiated and unirradiated regions would more effectively confine the light. In cases where larger diameter fibers are being coupled to the film, smaller refractive index differences in the film might be desirable, to provide a better size match between the waveguide dimensions and the fiber core. This would be particularly true for wavelengths of 1.3 to 1.5 microns.

The polymeric compositions of the present invention combine the transparency of their polymer backbone (they transmit ultraviolet, visible and infrared radiation) with the high photosensitivity and high quantum yield of the nitrone functional group. Irradiation of any of the polymeric nitrones of the present invention results in a decrease in their refractive indexes. Incorporation of up to 100 mol percent of nitrone side chain groups on the polymer is feasible, without phase segregation and scattering occurring at visible and near IR wavelengths, while maintaining high glass transition temperatures and good physical properties, such as solubility in common organic solvents used for spin coating.

Description of the Preferred Embodiments and of the Best Mode Presently Contemplated for its Practice The nitrones of Formula (I) can be synthesized with any desired copolymer composition wherein m ranges from 0 to 0.99, the preferred range being from about 0.05 to about 0.95, with the range from about 0.15 to about 0.85 being more preferred yet. These compositions provide changes in refractive index upon irradiation which are generally sufficient to delineate waveguides that confine light of wavelengths between 500 and 1,500 nm. In the case where $R^1=R^2=R^3=CH_3$ and Z=phenyl, the change in refractive index upon complete photochemical bleaching ranges from 0.035 to 0.008 for values of m = 0 to 0.8. When greater refractive index changes are needed for integrated optic and waveguide patterns, the proportion m of the comonomer should be reduced.

Operable ranges of n in all cases are from above about 10, and preferably up to about 2,000, with more preferred ranges of from about 20 to about 400, with the most preferred range being from about 70 to about 400. The number average molecular weight is typically in the 2,000 to 500,000 range. The most preferred molecular weight range for spin casting would be in the order of from about 10,000 to about 150,000. At molecular weights higher than about 150,000, there is a tendency for the viscosities of the solutions to become too high, even at relatively low weight percent solids content, for proper application by spin casting.

With reference to the polymers and copolymers of Formula (I), above, those wherein $R^1$ and $R^2$ are independently H or $C_1-C_{10}$ alkyl, straight chain, branched or cyclic, and $R^3$ is $C_1-C_{10}$ alkyl, straight chain, branched or cyclic, are preferred embodiments. More preferred yet are simple straight chain alkyl groups, such as methyl, ethyl, propyl or butyl. In the most preferred embodiment, each of $R^1$, $R^2$ and $R^3$ are methyl.

The preferred Z groups include aromatic and $C_1-C_{10}$ lower alkyl groups, with $C_1-C_4$ alkyl groups being more preferred yet. Desirably, these lower alkyl groups are branched, because branched groups prevent tautomerization and tend to impart improved hydrolytic and thermal stability. The oxaziridines formed from the N-alkyl nitrones are more stable and do not form long wavelength absorbing photoproducts on irradiation with ultraviolet light. Specific examples of preferred embodiments include tert- butyl and isopropyl. The most preferred embodiments are those wherein Z is tert-butyl.

When Z includes an aromatic moiety, then the phenyl or benzyl groups are preferred. Preferred embodiments of $R^6$ in the Z groups are represented by $C_1-C_{10}$ lower alkyl groups, more specifically methyl, ethyl, propyl or butyl groups.

The present invention will be better understood with reference to the following examples, which also set forth the best mode presently contemplated for its practice.

EXAMPLE 1

Preparation of 4-(2,5-dioxolanyl)phenyl methacrylate

A 500 mL round bottom flask fitted with reflux condenser, Dean Stark trap and nitrogen line was charged with 30.0 g of 4-formylphenyl methacrylate, 19.0 g of ethylene glycol, 250 mL of toluene and a catalytic amount of p-toluenesulfonic acid monohydrate. The solution was heated at reflux for 1 day, during which time the water formed in the reaction was removed periodically from the Dean Stark trap. Toluene was added to make up for losses from the Dean Stark trap, and the solution was heated at reflux for an additional 15 hours. Thereafter the solution was cooled to room temperature, was washed with three 75 mL portions of saturated sodium bicarbonate solution, and the toluene extracts were dried over anhydrous magnesium sulfate, filtered and concentrated in vacuo. The crude acetal was chromatographed on silica gel (20:1 silica gel to compound weight ratio) with hexane/ethylacetate (4:1 volume ratio) to give purified acetal (18.8 g). 1H NMR (CDCL3) 7,5 (d, 2H), 7,1 (d, 2H), 6.3 (s, 1H), 5.78 (s, 1H), 5.7 (s, 1H), 4.15–3.85 (m, 4H), 2.02 (s, 3H); 13C NMR (CDCl3) 165, 151, 135, 128, 127, 121, 103, 65, 18; IR (neat) 1,735 cm$^{-1}$ ester carbonyl. The spectral data are consistent with the postulated structure. The chromatographed acetal was used directly in the free radical polymerizations.

EXAMPLE 2

Polymerization of 4-(2,5-dioxolanyl)phenyl methacrylate

Purified 4-(2,5-dioxolanyl)phenyl methacrylate (12.0 g) was dissolved in 120 mL of dimethylformamide and placed in a side arm polymerization vessel. To this solution was added 1.2 mL of a toluene solution of VAZO-33 ® initiator (1 g of 2,2'-azobis(2,4-dimethyl-4-methoxyvaleronitrile) dissolved in 25 mL of toluene). The reaction vessel was taken through three evacuation, nitrogen-purge cycles to remove oxygen and sealed under vacuum. It was then placed in a constant temperature circulating water bath at 33° C. for 2½ days. The resulting polymer solution was poured into 300 mL of methanol, and the precipitated polymer was filtered, slurried with several portions of methanol and dried in vacuo to yield 10.9 g polymer product. The reduced viscosity (in chloroform) of polymer prepared in this manner was typically 0.26 dL/g. 1H NMR (CDCl3) 7.5–7.3 (2H), 7.2–7.0 (2H), 5.9–5.7 (1H), 4.2–3.9 (m, 4H), 2.6–1.7 (m, 2H), 1.7–1.2 (m, 3H); 13C NMR (CDCl3) 176–174 (m, ester), 151, 136, 128, 121, 103, 65, 51–55 (m, CH2), 46, 21–17; IR (KBr) 1,749 cm$-1$. The spectra are consistent with the structure of poly((4-(2,5-dioxolanyl)-phenyl)methacrylate). The reduced viscosity (in chloroform) of polymer prepared in the same manner as this example except with toluene as solvent in place of dimethylformamide was 0.22 dl/g

EXAMPLE 3

Preparation of poly[(4-formlylphenyl)methacrylate]; hydrolysis of poly[(4-(2,5-dioxolanyl)phenyl)methacrylate]

Poly[(4-(2,5-dioxolanyl)phenyl)methacrylate] (13.3 g) was dissolved in the minimum amount of THF necessary for complete dissolution. To this solution was added 16 mL of 5% aqueous HCl. The solution was stirred at room temperature for 24 hours and filtered into a stirred solution of sodium bicarbonate. The precipitated polymer was filtered and washed with several portions of water to remove excess sodium bicarbonate. The crude poly[(4-formylphenyl) methacrylate] was redissolved in methylene chloride, the solution was filtered to remove any insoluble material and dried over anhydrous magnesium sulfate. After filtration, the solvent was removed and the polymer dried in vacuo to yield 11.4 g of the desired product. 1H NMR (CDCl3) 10.0–9,8 (1H), 7.9–7.7 (2H), 2.6–1.8 (2H), 1.7–1.3 (3H); 13C NMR (CDCl3) 190, 175–174 (m, ester), 155, 134, 131, 122, 53, 46, 21–18; IR (KBr) 1,754, 1,701 cm−1. The spectral data are consistent with the structure of poly[(4-formylphenyl) methacrylate].

EXAMPLE 4

Reaction of poly[(4-formylphenyl)methacrylate] with phenylhydroxylamine: synthesis of poly[{4-(N-phenyl-α-nitronyl)phenyl}methacrylate] homopolymer Phenylhydroxylamine (10.0 g) and poly[(4-formylphenyl)methacrylate] (10.0 g) were dissolved in methylene chloride and stirred (excluding ambient light) for 2½ days. The resulting solution was poured into a stirred methanol solution. The precipitated nitrone polymer was filtered, washed with several portions of methanol to remove the excess phenylhydroxylamine, and then dried in vacuo to give 14.2 g of the desired product. 1H NMR (CDCl3) 8.6–8.2 (2H), 8.2–7.8 (1H), 7.8–7.5 (2H), 7.5–6.8 (5H), 3.0–2.0 (2H), 2.0–1.0 (3H); 13C NMR (CDCl3) 176–174 (ester), 152, 149, 133, 131, 130, 129, 122, 121, 55–52 (CH2), 46, 21–18 (3H); IR (KBr) 1,726 cm−1. The spectral data were consistent with the structure of the methacrylate derived nitrone homopolymer, poly[(4-N-phenyl-α-nitronyl)phenyl methacrylate]. The intrinsic viscosity (in chloroform) was 0.26 dL/g and light scattering data provided a number average molecular weight estimate of 43,000 and a polydispersity of 4.2. DSC did not show a $T_g$ between −100° C. and 250° C. TMA indicated that the $T_g$ was approximately 199° C. TGA showed 1% thermally induced weight loss below 200° C. A gradual weight loss began at 200° C. and accelerated above 250° C. Wide angle X-ray data showed that the polymer was amorphous in the as-precipitated form.

EXAMPLE 5

Copolymers of methylmethacrylate and 4-(2,5-dioxolanyl) phenyl methacrylate—general procedure A chromatographed sample of 4-(2,5-dioxolanyl)phenyl methacrylate was dissolved in anhydrous dimethylformamide in a polymerization flask with a side arm used for evacuation and nitrogen purging. The appropriate feed amount of commercial methylmethacrylate (hydroquinone monomethyl ether inhibitor removed) was then added. A 1:5 ratio of the total weight of monomers to dimethylformamide was maintained. The initiator (0.09–017 mol % of VAZO-33 ® in toluene) was added. The polymerization vessel was alternately evacuated and purged with nitrogen (three times) to remove oxygen, sealed under vacuum and placed in a circulating constant temperature water bath at 33° C. for 36 hours. The copolymer was precipitated in methanol solution (2.5 times the DMF reaction volume), filtered, slurried with several portions of methanol, refiltered and dried at 40° C. in a vacuum oven. The resultant product was a copolymer of composition 79 mol percent 4-(2,5-dioxolanyl)phenyl methacrylate and 21 mol percent methylmethacrylate. 1H NMR (CDCl3) 7.5–7.3, 7.2–7.0, 5.9–5.7, 4.2–3.9, 2.6–1.8, 1.8–0.9. A summmary of the molar ratios and glass transition temperatures for a series of copolymers is given in Table 1, below.

TABLE 1

Composition and Glass Transition Temperatures for Exemplary Copolymers of Methylmethacrylate and 4-(2,5-dioxolanyl)-Methacrylate.

| Feed Ratios (mol %) | | NMR Ratios (mol %) | | | |
|---|---|---|---|---|---|
| Acetal | MMA | Acetal | MMA | Yield | $T_g$ (°C.) |
| 0.2 | 0.8 | 0.22 | 0.78 | 89% | 85 |
| 0.4 | 0.6 | 0.44 | 0.56 | 75% | |
| 0.6 | 0.4 | 0.61 | 0.39 | 96% | |
| 0.8 | 0.2 | 0.79 | 0.21 | 79% | 104 |

GPC analysis of a copolymer with composition 17 mol % acetal, and 83 mol % methylmethacrylate provided a number average molecular weight of 65,000 and a polydispersity of 2.6. A 53 mol % acetal 47 mol % methylmethacrylate copolymer had a number average molecular weight of 55,000 and polydispersity of 4.5.

EXAMPLE 6

Hydrolysis of copolymers of methylmethacrylate and 4-(2,5-dioxolanyl)phenyl methacrylate—general procedure Methylmethacrylate and 4-(2,5-dioxolanyl)phenyl methacrylate copolymers prepared as in Example 5 were dissolved in the minimum amount of THF necessary for complete dissolution. To these solutions was added 5% aqueous HCl (4 mL for 4 g of polymer) and the reaction mixture was stirred at room temperature for 24 hours. The resulting polymer was precipitated in an aqueous sodium bicarbonate solution and filtered. The polymer was washed with several portions of water. Each batch was redissolved in methylene chloride, filtered to remove remaining sodium bicarbonate and dried over anhydrous magnesium sulfate. These solutions were used without further purification to prepare the corresponding nitrone/methylmethacrylate copolymers.

EXAMPLE 7

Copolymers of methylmethacrylate and 4-(N-phenyl-α-nitronyl) methacrylate: reaction of the copolymer of methylmethacrylate and 4-formylphenyl methacrylate with phenylhydroxylamine A methylene chloride solution of 4.21 g of a copolymer composed of 80 mol % methylmethacrylate and 20 mol % 4-formylphenyl methacrylate prepared as described in Example 6 was treated with phenylhydroxylamine (2:1 phenylhydroxylamine to aldehyde ratio). The reaction mixture was stirred at room temperature over night and the resulting solution was poured into methanol and filtered. The crude nitrone polymer was redissolved in methylene chloride and reprecipitated in methanol to give 3.69 g of the desired product. This dissolution and reprecipitation procedure was repeated. The polymer was then dried in vacuo to give 2.68 g of product. This procedure was repeated for copolymers of other compositions. A sample of a copolymer containing 82 mol % nitrone repeat units and 18 mol % methylmethacrylate repeat units showed spectral data consistent with the proposed structure. 1H NMR (CDCl3) 8.5–8.2, 8.1–7.8, 7.8–7.6, 7.4–7.0, 3.7–3.5, 2.1–1.8, 1.8–1.0; 13C NMR (CDCl3) 176–174 (ester), 152, 149, 134, 131, 130, 129, 128.5, 122, 121, 54, 52, 46, 20, 18.

TABLE 2

Composition and Glass Transition Temperatures for Copolymers of Methylmethacrylate and 4-(N-phenyl-α-nitronyl)phenyl Methacrylate

| Feed Ratio (mol %) | | 1H NMR Ratios (mol %) | | |
|---|---|---|---|---|
| MMA | Aldehyde | MMA | Nitrone | $T_g$ (°C.) |
| 78 | .22 | .84 | .16 | 135 |
| 56 | .44 | .56 | .44 | 156 |
| 39 | .61 | insoluble gel | | |
| 21 | .79 | .18 | .82 | 175 |

COMPARATIVE TEST

Attempted Polymerization of 4-(N-phenyl-α-nitronyl)phenyl Methacrylate

An anhydrous DMF solution of 0.5 g of 4-(N-phenyl-α-nitronyl)phenyl methacrylate was placed in a 50 mL side arm polymerization flask, and 2.9 mg of VAZO-64 ® initiator was added to this solution. The flask was thrice evacuated and purged with nitrogen, then placed in an oil bath and heated at 70° C. for 12 hours. After cooling at room temperature, thin layer chromatography (silica gel, ethyl acetate) showed only one spot with identical $R_f$ to the starting nitrone. An aliquot of the DMF solution was poured into methanol. No polymeric material precipitated.

EXAMPLE 8

Photochemically Induced Refractive Index Changes in Thin Films of Poly[{4-(N-phenyl-α-nitronyl)phenyl}methacrylate] Homopolymer A solution of 0.9 g of poly[{4-(N-phenyl-α -nitronyl)phenyl}methacrylate] homopolymer (prepared as in Example 4) in 3 mL of dimethylformamide was spin coated on a 2" silicon wafer (2,300 rpm) and baked at 125° C. for 1.5 hours. The film was then irradiated through a 313 nm narrow band interference filter with a 1000 W xenon arc lamp. Refractive index measurements were made at intervals during the photolysis using the Metricon ®, which measures coupling angles for TE and TM guided modes. The approximate film thickness was 1.85 microns. A step index was assumed to calculate the tabulated refractive indices shown in Table 3, below:

TABLE 3

Refractive Index vs. Irradiation Time for Poly[{4-(N-phenyl-α-nitronyl)phenyl}methacrylate] Homopolymer

| | Refractive Index | |
|---|---|---|
| Time (s) | 632.8 nm | 815 nm |
| 0 | 1.6588 | 1.6502 |
| 30 | 1.6588 | 1.6505 |
| 45 | 1.6590 | 1.6502 |
| 75 | 1.6588 | 1.6498 |
| 120 | 1.6595 | 1.6503 |
| 180 | 1.6581 | 1.6496 |
| 240 | 1.6582 | 1.6589 |
| 600 | | 1.6446 |
| 3600 | 1.6147 | 1.6243 |
| 7200 | 1.6281 | 1.6226 |
| 19800 | 1.6293 | 1.6240 |
| 21600 | 1.6293 | 1.6242 |

TABLE 3-continued

Refractive Index vs. Irradiation Time for Poly[{4-(N-phenyl-α-nitronyl)phenyl}methacrylate] Homopolymer

| Time (s) | Refractive Index | |
|---|---|---|
| | 632.8 nm | 815 nm |
| 28800 | 1.6299 | 1.6247 |

EXAMPLE 9

A film of poly[{4-(N-phenyl-α-nitronyl)phenyl} methacrylate] was prepared on a 1" diameter quartz disc by spin coating from dimethylacetamide. The film was baked at 80° C. for 30 min. It was 0.51 microns thick and carried one guided-wave mode at 815 nm. This sample was irradiated with a 1000 W Xenon arc lamp through a 361 nm interference filter (11 nm FWHM, 0.7 mW cm$^{-2}$) and the effective index of the single guided mode was measured by a prism coupling technique (Metricon ®) as a function of the total irradiation dose. Table 4 summarizes the data.

TABLE 4

Effective Refractive Index as a Function of Irradiation Dose for Poly[{4-(N-phenyl-α-nitronyl)phenyl}methacrylate] Homopolymer on Quartz

| Fluence (mJ/cm2) | $n_{effective}$ |
|---|---|
| 0 | 1.5674 |
| 21 | 1.5622 |
| 63 | 1.5543 |
| 84 | 1.5516 |
| 126 | 1.5467 |
| 168 | 1.5396 |
| 210 | 1.5372 |
| 252 | 1.5362 |

EXAMPLE 10

Photochemically Induced Refractive Index Changes in Thin Films of Poly[{4-(N-phenyl-α-nitronyl)phenyl} methacrylate] and Copolymers of Methylmethacrylate with 4-(N-phenyl-α-nitronyl)phenyl methacrylate as a Function of Weight Percent Nitrone Monomer Content A series of solutions of poly[{(4-N-phenyl-α-nitronyl)phenyl)methacrylate] and copolymers of methylmethacrylate and 4-(N-phenyl-α-nitronyl)phenyl methacrylate were prepared containing 15-20 wt % polymer in anhydrous dimethylacetamide. These solutions were filtered through 0.45 micron TFE filters and then spin coated on silicon wafers having a 1.6 micron thick thermal oxide layer. The films were dried at 80° C. for 15 to 30 min. and the refractive index of the films was measured at 815 nm with a prism coupling technique (Metricon ®). The films were then irradiated with a 1000 W Xenon arc lamp through a 361 nm interference filter (11 nm FWHM, 0.7 mW cm−2) to a total dose of 400 mJ/cm−2 to fully bleach the nitrone chromophore. The refractive index was again measured. Table 6 summarizes the refractive index measurements.

TABLE 6

Refractive Index Measurements at 815 nm for Thin Films of Poly[{4-(N-phenyl-α-nitronyl)phenyl} methacrylate] and Copolymers of Methyl Methacrylate and 4-(N-phenyl-α-nitronyl) phenyl Methacrylate, before and after Irradiation at 316 nm

| mol % | wt % | thickness (microns) | $n_{before}$ | $n_{after}$ |
|---|---|---|---|---|
| 18 | 39.3 | 0.871 | 1.5430 | 1.5349 |
| 18 | 39.3 | 0.868 | 1.5435 | 1.5397 |
| 44 | 68.8 | 1.14 | 1.5982 | 1.5837 |
| 82 | 92.8 | 0.465 | 1.6319 | 1.6070 |
| 100 | 100 | 0.406 | 1.6507 | 1.6154 |
| 100 | 100 | 0.417 | 1.6501 | 1.6197 |

EXAMPLE 11

Photochemical Delineation of Waveguide Patterns in Poly[{4-(N-phenyl-α-nitronyl)phenyl}methacrylate] Homopolymer prepared from Poly[(4-formylphenyl)methacrylate]

A solution composed of 0.3 g of poly[{4-(N-phenyl-α-nitronyl)phenyl}methacrylate] homopolymer (prepared as in Example 4) in 1.75 g of dimethylacetamide was filtered through a 0.45 micron filter, then spin cast at 4,000 rpm on a silicon wafer and dried at 80° C. for 20 min., then at 115° C. for 10 min. The refractive index of the resulting 0.75 micron film measured at 632.8 nm was 1.6611 (assumes a step index profile). This film was irradiated with a 1000 W Xenon arc lamp through a 313 nm narrow band interference filter (total dose =1.5 J/cm2). The refractive index of the film was measured to be 1.6222 at 632.8 nm after the irradiation.

A second film of the nitrone homopolymer was formed by spin casting it from dimethylacetamide solution on a quartz optical flat. The film was dried at 80° C. for 20 min., followed by 15 min. at 115° C. The UV-visible spectrum of this 0.8 micron thick film had an optical density of greater than 4.0 OD at 320 nm. The film was irradiated with doses of 150, 300, and 450 mJ/cm² (313 nm interference filter) and a UV-visible spectrum was taken after each dose. The absorption spectrum taken after the 450 mJ/cm² dose showed an optical density of 0.68 at 320 nm.

A third film of the homopolymer was spun, this time on an oxided silicon wafer (1.5 micron thick oxide). This film was baked for 20 min. at 80° C. and then 10 min, at 115° C. This sample was irradiated through a mask with a Mach-Zehnder interferometer pattern together with a one-by-eight splitter pattern (3 micron channel waveguide structures, negative pattern). Channel waveguide refractive index patterns could be observed in the films under a microscope equipped with a 100x Nomarski objective (1000 magnification) in polarized light. The silicon wafer was cleaved across the input and output legs of the Mach Zehnder interferometer and the one by eight splitter. The 810 nm output from a diode laser was butt coupled into the input legs of the two patterns. A TV camera sensitive to 810 nm light was used to show that the light was guided in the channels defined by the photochemically induced refractive index patterns and was split uniformly into the eight output legs of the one-by-eight splitter.

EXAMPLE 12

Laser Writing of Waveguide Patterns in Poly[{4-(N-phenyl-α-nitronyl)phenyl}methacrylate] Homopolymer Prepared from Poly[(4-formylphenyl)methacrylate]

A solution of 0.22 g of poly[(N-phenyl-α-nitronyl)phenyl]nitrone homopolymer prepared as in Example 4 and 1.25 g of dimethylacetamide was spin coated at 6,000 rpm on a silicon wafer having a 1.6 micron thermal oxide layer. The coated wafer was baked at 80° C. for 15 min. to remove the dimethylacetamide spinning solvent from the film. Optical waveguides were delineated in the nitrone film using a laser writing apparatus which consisted of an argon ion laser operating at 351 nm, focussing optics and XY translation stages to move the wafer. To produce an optical waveguide, the laser beam was focussed onto the coated wafer and two parallel lines were exposed in the nitrone polymer by scanning the wafer at 250 microns/s. using the XY translation stages. The laser beam power was typically 1.4 microwatt and the spot diameter was approximately 5 microns. The laser beam decreased the refractive index in the exposed regions to form the lateral boudaries of the waveguide. When the center-to-center laser-written spacing was 7 microns and the laser written lines were 5 microns wide, the resulting waveguide (the unexposed area between the laser-written lines) was 2 microns wide. By coupling 810 nm light from an optical fiber into the waveguide and observing the output intensity profile, it was determined that the 2 micron wide waveguide propagated only a single TE mode. Laser-written waveguides equal to, or greater than, 3 microns wide were multimode waveguides and propagated more than a single TE mode at 810 nm.

EXAMPLE 13

Synthesis of Poly[{4-(N-tert-butyl-α-nitronyl)phenyl}methacrylate]

To a solution of 10 g of poly[(4-formylphenyl) methacrylate] (prepared as in Example 3) in the minimum amount of methylene chloride is added 10 g of tert-butylhydroxyl amine. This solution is stirred at room temperature in the dark for 2 days. The solution is poured into two times the volume of methanol and the precipitated polymer is filtered. The nitrone bearing polymer is redissolved in methylene chloride and reprecipitated in methanol. The poly[{4-(N-tert-butyl-α-nitronyl)phenyl}methacrylate] is dried at 25° C. in vacuo for 2 days.

While the invention has been illustrated by the embodiments described in detail, above, it is to be understood that when other starting materials within the purview of the present invention are subjected to procedures generally and in detail herein described, then homo- or copolymers within the broad scope of this invention will be obtained, which can be formed into thin films, wherein waveguiding structures can be delineated, all as described. For example, Since various changes may be made in the invention without departing from its spirit and essential characteristics, it is intended that all matter contained in the description shall be interpreted as illustrative only and not in a limiting sense, the scope of the invention being defined by the appended claims.

I claim:

1. A polymeric nitrone of the composition

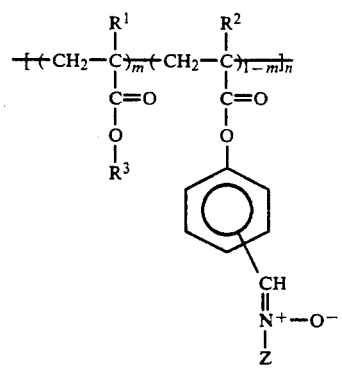

wherein
(a) n is an integer greater than 10;
(b) m is 0–0.99;
(c) $R^1$ and $R^2$, which are the same or different, are H or $C_1$–$C_{20}$ alkyl, straight chain, branched or cyclic, with the proviso that when $R^1$ and/or $R^2$ represent an alkyl group other than methyl, then its alpha-carbon always represents a —$CH_2$— group;
(d) $R^3$ is a saturated $C_1$–$C_{20}$ aliphatic, aromatic or mixed aliphatic/aromatic hydrocarbon group;
(e) Z is
  (i) a $C_1$–$C_{20}$ alkyl group, straight chain, branched or cyclic; or
  (ii)

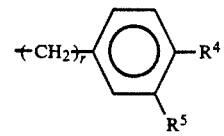

wherein r is 0 or 1, and wherein $R^4$ and $R^5$, which are the same or different, are selected from the group consisting of H, F, Cl, Br, I, —CN, —$NO_2$, —$NH_2$, —$R^6$, —$NR^6_2$, —$OR^6$, and —CH=CH=$COOR^6$ wherein $R^6$ is a $C_1$–$C_{20}$ alkyl group, straight chain, branched or cyclic.

2. A polymeric nitrone according to claim 1 wherein m is 0.

3. A polymeric nitrone according to claim 2 wherein $R^2$ is selected from the group consisting of H and $C_1$–$C_{10}$ alkyl, straight chain, branched or cyclic, and Z is $C_1$–$C_{10}$ alkyl, straight chain, branched or cyclic.

4. A polymeric nitrone according to claim 2 wherein $R^2$ is selected from the group consisting of H, methyl, ethyl, n-propyl and n-butyl, and Z is selected from the group consisting of isopropyl and tert-butyl.

5. A polymeric nitrone according to claim 2, wherein $R^2$ is selected from the group consisting of H and $C_1$–$C_{10}$ alkyl, straight chain, branched or cyclic, and Z is

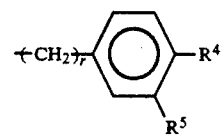

wherein r is 0 or 1, and wherein $R^4$ and $R^5$, which are the same or different, are selected from the group consisting of H, F, Cl, Br, I, —CN, —NO$_2$, —NH$_2$, —R$^6$, —NR$^6{}_2$, —OR$^6$, and —CH=CH—COOR$^6$ wherein R$^6$ is a C$_1$-C$_{20}$ alkyl group, straight chain, branched or cyclic.

6. A polymeric nitrone according to claim 5 wherein R$^2$ is selected from the group consisting of H and C$_1$-C$_{10}$ alkyl, straight chain, branched or cyclic, and wherein R$^4$ and R$^5$, which are the same or different, are selected from the group consisting of H, —CN, —R$^6$, —NR$^6{}_2$, —OR$^6$, and —CH=CH—COOR$^6$ wherein R$^6$ is a C$_1$-C$_{10}$ alkyl group, straight chain, branched or cyclic.

7. A polymeric nitrone according to claim 6 wherein R$^2$ and R$^6$ are each independently selected from the group consisting of H, methyl, ethyl, n-propyl and n-butyl.

8. A polymeric nitrone according to claim 2 wherein R$^2$ is methyl, and Z is phenyl.

9. A polymeric nitrone according to claim 2 wherein R$^2$ is methyl, and Z is tert-butyl.

10. A polymeric nitrone according to claim 1 wherein m is greater than 0.

11. A polymeric nitrone according to claim 10 wherein R$^1$ and R$^2$ are independently selected from the group consisting of H and C$_1$-C$_{10}$ alkyl, straight chain, branched or cyclic, and R$^3$ and Z are independently C$_1$-C$_{10}$ alkyl, straight chain, branched or cyclic.

12. A polymeric nitrone according to claim 10 wherein R$^1$ and R$^2$ are independently selected from the group consisting of H, methyl, ethyl, n-propyl and n-butyl, R$^3$ is a mixed aromatic/aliphatic group, and Z is selected from the group consisting of isopropyl and tert-butyl.

13. A polymeric nitrone according to claim 10, wherein R$^1$ and R$^2$ are independently selected from the group consisting of H and C$_1$-C$_{10}$ alkyl, straight chain, branched or cyclic, R$^3$ is selected from the group consisting of phenyl, benzyl, methyl, ethyl, iso-propyl and tert-butyl, and Z is

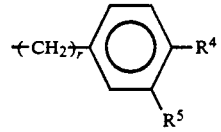

wherein r is 0 or 1, and wherein R$^4$ and R$^5$, which are the same or different, are selected from the group consisting of H, F, Cl, Br, I, —CN, —NO$_2$, —NH$_2$, —R$^6$, —NR$^6{}_2$, —OR$^6$, and —CH=CH—COOR$^6$ wherein R$^6$ is a C$_1$-C$_{20}$ alkyl group, straight chain, branched or cyclic.

14. A polymeric nitrone according to claim 13, wherein R$^4$ and R$^5$, which are the same or different, are selected from the group consisting of H, —CN, —R$^6$, —NR$^6{}_2$, —OR$^6$, and —CH=CH—COOR$^6$ wherein R$^6$ is a C$_1$-C$_{10}$ alkyl group, straight chain, branched or cyclic.

15. A polymeric nitrone according to claim 14 wherein m is from about 0.05 to about 0.95, and wherein R$^2$ and R$^6$ are each independently selected from the group consisting of H, methyl, ethyl, n-propyl and n-butyl.

16. A polymeric nitrone according to claim 10 wherein m is from about 0.05 to about 0.95, and wherein R$^1$ R$^2$ and R$^3$ are methyl, and Z is phenyl.

17. A polymeric nitrone according to claim 10 wherein m is from about 0.05 to about 0.95, and wherein R$^1$ R$^2$ and R$^3$ are methyl, and Z is tert-butyl.

18. A substrate having deposited thereon a film comprising a polymeric nitrone according to any one of claims 2, 10, 7, 8, 9, 12, 14, 15, 16 or 17.

* * * * *